US011996635B2

(12) United States Patent
Yamamoto

(10) Patent No.: US 11,996,635 B2
(45) Date of Patent: May 28, 2024

(54) ELECTRONIC WATCH WITH BUILT-IN ANTENNA

(71) Applicant: Seiko Epson Corporation, Tokyo (JP)

(72) Inventor: Hironobu Yamamoto, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 308 days.

(21) Appl. No.: 17/024,899

(22) Filed: Sep. 18, 2020

(65) Prior Publication Data

US 2021/0091471 A1 Mar. 25, 2021

(30) Foreign Application Priority Data

Sep. 20, 2019 (JP) ................................ 2019-171304

(51) Int. Cl.

| | |
|---|---|
| ***H01Q 9/04*** | (2006.01) |
| ***G04B 47/06*** | (2006.01) |
| ***G04R 60/02*** | (2013.01) |
| ***G04R 60/06*** | (2013.01) |

(52) U.S. Cl.

CPC ........... *H01Q 9/0407* (2013.01); *G04B 47/06* (2013.01); *G04R 60/02* (2013.01); *G04R 60/06* (2013.01)

(58) Field of Classification Search

CPC .......... H01Q 9/0407; H01Q 1/38; H01Q 9/42; H01Q 1/273; G04B 47/06; G04R 60/02; G04R 60/06; G04R 60/12; G04C 10/02

See application file for complete search history.

(56) References Cited

U.S. PATENT DOCUMENTS

| | | | | |
|---|---|---|---|---|
| 2011/0013491 A1* | 1/2011 | Fujisawa | ................ | G04R 60/08 368/205 |
| 2011/0051561 A1 | 3/2011 | Fujisawa | | |
| 2013/0242711 A1 | 9/2013 | Fujisawa | | |
| 2014/0126337 A1 | 5/2014 | Fujisawa | | |
| 2014/0232603 A1* | 8/2014 | Fujisawa | .................. | H01Q 1/24 343/702 |
| 2018/0069304 A1* | 3/2018 | Aizawa | .................. | H01Q 1/273 |
| 2018/0239308 A1* | 8/2018 | Yamamoto | ............. | G04R 60/10 |

FOREIGN PATENT DOCUMENTS

| | | |
|---|---|---|
| JP | 2011-021929 A | 2/2011 |
| JP | 2018-169189 A | 11/2018 |
| JP | 2019-070674 A | 5/2019 |

* cited by examiner

*Primary Examiner* — Hai V Tran
*Assistant Examiner* — Michael M Bouizza
(74) *Attorney, Agent, or Firm* — Harness, Dickey & Pierce, P.L.C.

(57) ABSTRACT

An electronic watch with a built in antenna includes a watch case including a case body configured of a conductive material, a bezel configured of a conductive material and provided on a watch front surface side of the case body, and a cover glass attached to the bezel. The electronic watch includes a dial disposed inside the watch case, a dial ring disposed around the dial, and an antenna disposed inside the watch case. At least a portion of the antenna is disposed outside an outer circumference of the dial in plan view as seen from a direction orthogonal to a front surface of the dial. At least one of the dial, the dial ring, and the cover glass is a dielectric disposed to be closer to the watch front surface side than to the antenna and disposed within a predetermined distance from the antenna, the distance being set in accordance with a wavelength of radio waves received by the antenna.

6 Claims, 8 Drawing Sheets

ELECTRONIC WATCH WITH BUILT-IN ANTENNA

The present application is based on, and claims priority from JP Application Serial Number 2019-171304, filed Sep. 20, 2019, the disclosure of which is hereby incorporated by reference herein in its entirety.

BACKGROUND

1. Technical Field

The present disclosure relates to an electronic watch with a built-in antenna.

2. Related Art

In a small electronic watch, such as a wrist watch, an electronic watch with a built-in antenna is known that incorporates a patch antenna that receives satellite signals (see JP-A-2019-70674).

In the watch disclosed in JP-A-2019-70674, there is a problem with restrictions on the layout of components, such as a patch antenna and a step motor, due to a configuration in which the patch antenna is arranged between a main plate and a case back. This causes a movement to become thicker, and, since the patch antenna needs to be disposed so as not to overlap, in plan view, with other components, such as the step motor, and a battery, the diameter of the movement increases.

In addition, it is conceivable to use an inverted-F antenna, an annular antenna, or the like, which can reduce the thickness and size of the movement and has less impact on the component layout, compared to a case in which the patch antenna is used. In the case of these antennas, the planar size thereof increases compared to the patch antenna, and since the antenna is disposed in close proximity to a bezel, there is a problem in that reception performance deteriorates when a metal bezel is used.

SUMMARY

In an electronic watch with a built-in antenna according to the present disclosure, the electronic watch includes a watch case including a case body configured of a conductive material, a bezel configured of a conductive material and provided on a watch front surface side of the case body, and a cover glass attached to the bezel, a dial disposed inside the watch case, a dial ring disposed around the dial, and an antenna disposed inside the watch case, with at least a portion of the antenna being disposed outside an outer circumference of the dial in plan view as seen from a direction orthogonal to a front surface of the dial. At least one of the dial, the dial ring, and the cover glass is a dielectric disposed to be closer to the watch front surface side than to the antenna and disposed within a predetermined distance from the antenna, the distance being set in accordance with a wavelength of radio waves received by the antenna.

In the electronic watch with the built-in antenna according to the present disclosure, the dielectric is preferably configured of a material having a relative dielectric constant from 2 times to 5 times greater than a relative dielectric constant of a non-conductive material configuring the dial.

In the electronic watch with the built-in antenna according to the present disclosure, the antenna is preferably a planar antenna disposed between the dial and a main plate disposed inside the watch case, and including a substrate configured of a non-conductive material, and an electrode formed on the substrate.

In the electronic watch with the built-in antenna according to the present disclosure, the antenna is preferably an annular antenna disposed between the dial and the watch case.

In the electronic watch with the built-in antenna according to the present disclosure, a distance between the antenna and the dielectric is preferably 1/42 or less of the wavelength of the radio waves.

DESCRIPTION OF EXEMPLARY EMBODIMENTS

First Embodiment

An electronic watch 1 with a built in antenna according to a first embodiment will be described below with reference to the drawings. Note that, in the following description, the electronic watch 1 with the built-in antenna will be described simply as the electronic watch 1. Further, in the present embodiment, a cover glass 13 side of the electronic watch 1 illustrated in FIG. 2 will be described as a watch front surface side or an upper side, and a case back 14 side will be described as a watch back surface side or a lower side.

As described below, the electronic watch 1 according to the present embodiment includes a plate-shaped inverted-F antenna 50, and is configured to obtain satellite time information by receiving satellite signals from a position information satellite, such as a plurality of GPS satellites or quasi-zenith satellites orbiting above the Earth in a predetermined trajectory, and to correct internal time information.

Figure 1:
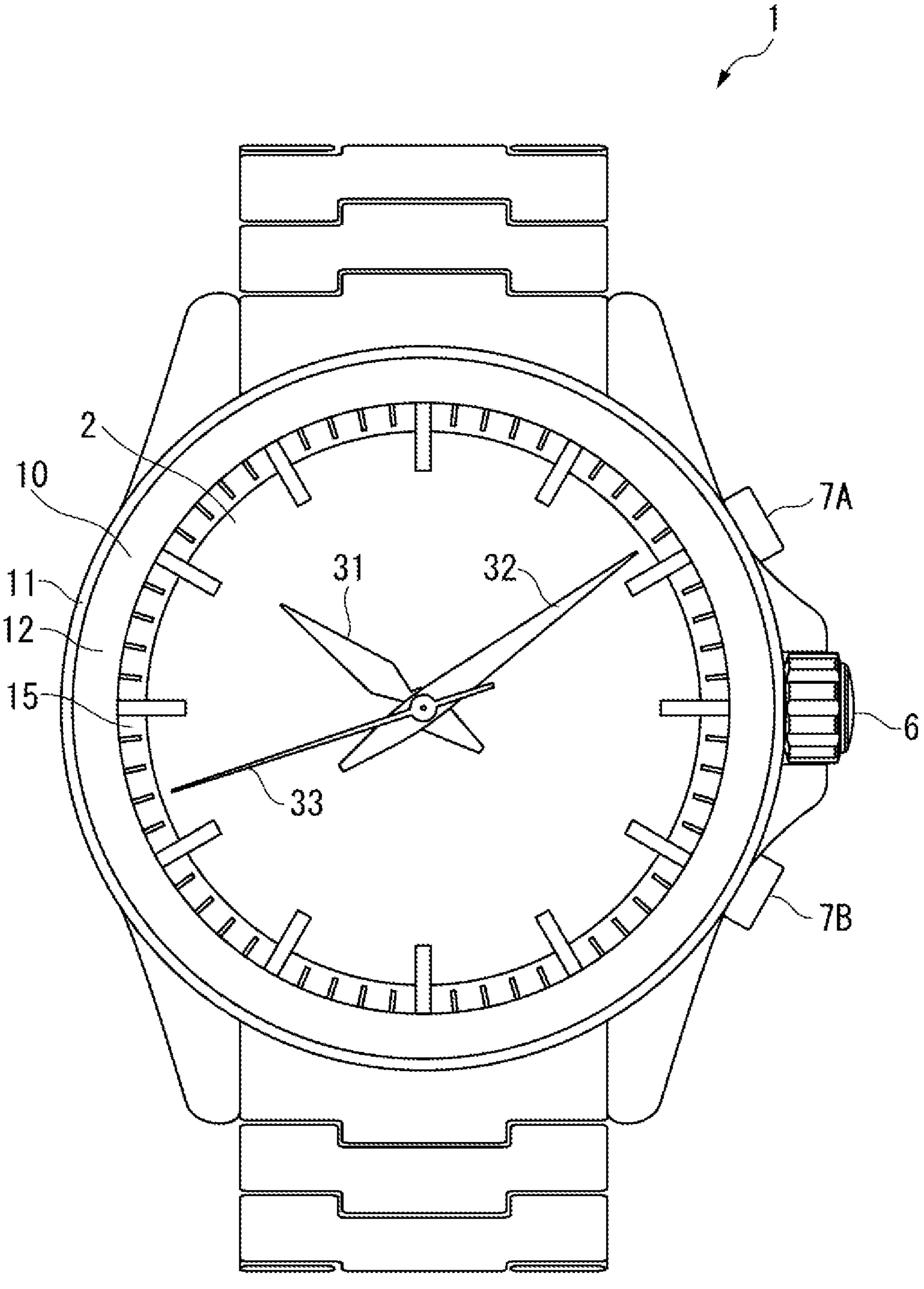
FIG. 1 is a front view illustrating main portions of an electronic watch with a built-in antenna according to a first embodiment.
Figure 2:
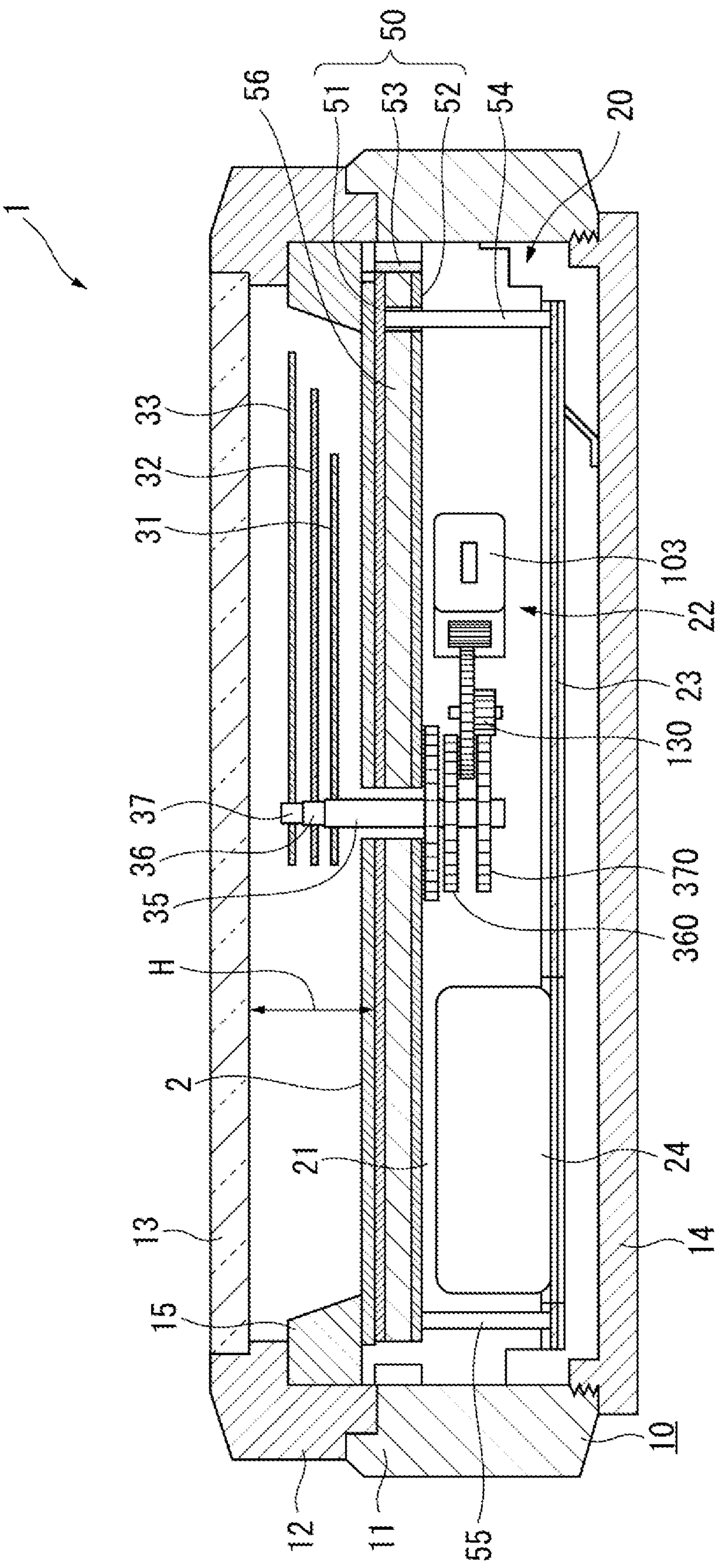
FIG. 2 is a cross-sectional view illustrating the main portions of the electronic watch with the built-in antenna.

As illustrated in FIG. 1 and FIG. 2, the electronic watch 1 is provided with a watch case 10 that accommodates a dial 2, a movement 20, an hour hand 31, a minute hand 32, a seconds hand 33, the inverted-F antenna 50, a battery 24, and the like. Further, the electronic watch 1 is provided with a crown 6 and two buttons 7A and 7B for external operations. The movement 20 is provided with pointer shafts 35, 36, and 37 to which the hour hand 31, the minute hand 32, and the seconds hand 33 are respectively attached, and the pointer shafts 35 to 37 are formed of a conductive material such as metal. Note that FIG. 2 is a cross-sectional view taken along a line connecting the 6 o'clock position and the 12 o'clock position of the dial 2.

The dial 2 is formed in a disc shape by a non-conductive member such as a polycarbonate resin. The dial 2 of the present embodiment is formed of a polycarbonate resin having a relative dielectric constant of 3.

The coaxially provided three pointer shafts 35, 36, and 37 are disposed at the planar center of the dial 2. The pointer shaft 35 is an hour wheel, and the hour hand 31 is attached thereto. The pointer shaft 36 is configured by center wheel and pinion 360 and a cannon pinion attached to the center wheel and pinion 360, and the minute hand 32 is attached to the pointer shaft 36. The pointer shaft 37 is configured by fourth wheel and pinion 370 and a shaft of the fourth wheel and pinion 370, and the seconds hand 33 is attached to the pointer shaft 37. These pointer shafts 35, 36, and 37 are configured by a conductive material. Note that in the present embodiment, a date window or a date indicator is not provided, but these may also be provided.

The hour hand 31, the minute hand 32, and the seconds hand 33 are driven via a step motor and a train wheel, which will be described below. Further, the hour hand 31, the minute hand 32, and the seconds hand 33 are configured entirely by a conductive metal material.

In the present embodiment, plan view means viewing the dial 2 and the like from an axial direction orthogonal to a front surface of the dial 2 facing the cover glass 13, that is, from an axial direction of the pointer shafts 35 to 37.

As illustrated in FIG. 2, the watch case 10 is provided with a cylindrical case body 11, a ring-shaped bezel 12 fixed to a front surface side of the case body 11, the cover glass 13 fixed to the bezel 12, and the case back 14 attached to the case body 11. Note that in the present embodiment, the case body 11 and the case back 14 are configured as separate bodies, but the configuration is not limited thereto, and a one-piece case may be used in which the case body 11 and the case back 14 are integrated.

The case body 11, the bezel 12, and the case back 14 are manufactured using a metal material such as stainless steel, titanium alloy, aluminum, brass, and the like. In the present embodiment, the bezel 12 is configured by stainless steel.

The cover glass 13 is manufactured using a transparent material such as glass or a synthetic resin material, and in the present embodiment, the cover glass 13 is configured by plate-shaped sapphire glass. The plate-shaped sapphire glass has a relative dielectric constant of 10 and is formed of monocrystalline sapphire configured by high purity alumina. Further, the cover glass 13 has a diameter of 31 mm and a thickness of 1.3 mm.

Next, an internal structure built into the watch case 10 of the electronic watch 1 will be described.

As illustrated in FIG. 2, in addition to the dial 2, a dial ring 15, the movement 20, the inverted-F antenna 50, and the like are accommodated in the watch case 10.

The dial ring 15 is configured by a polycarbonate resin or the like in the same manner as the dial 2. The dial ring 15 of the present embodiment is formed of a polycarbonate resin having a relative dielectric constant of 3. The dial ring 15 is disposed along the outer circumference of the dial 2. The outer circumference of the dial 2 is greater than the inner circumference of the dial ring 15, and by covering an outer circumferential upper surface of the dial 2 with the inner circumference of the dial ring 15, the dial ring 15 causes the outer circumference of the dial 2 to be unseen.

The movement 20 is provided with a main plate 21, a train wheel bridge (not illustrated), a driver 22 supported by the main plate 21 and the train wheel bridge, a printed wiring board 23, and the battery 24. The main plate 21 is formed of a non-conductive member such as plastic.

As illustrated in FIG. 2, the driver 22 is disposed between the main plate 21 and the train wheel bridge, and is configured to include a first motor and a first train wheel for driving the hour hand 31, a second motor and a second train wheel for driving the minute hand 32, and a third motor 103 and a third train wheel 130 for driving the seconds hand 33. Note that in FIG. 2, only the third motor 103 and the third train wheel 130 are illustrated, and the first motor, the second motor, the first train wheel, and the second train wheel are omitted.

Although not illustrated in FIG. 2, a control IC, a receiver IC, and the like are mounted on the printing wiring board 23. The control IC typically controls driving of the first motor, the second motor, and the third motor 103, and performs time display processing for displaying a time by moving the hour hand 31, the minute hand 32, and the seconds hand 33.

Further, upon receiving the satellite signal, the control IC operates the receiver IC to perform reception processing by the inverted-F antenna 50, and at the same time, operates the first motor, the second motor, and the third motor 103 to perform reception movement processing in which the hour hand 31, the minute hand 32, and the seconds hand 33 are moved to a reception standby position and stopped.

The battery 24 may be a primary battery or a secondary battery. When the secondary battery is provided, a power generation device for charging the secondary battery may be incorporated into the electronic watch 1. For example, when a solar panel is provided as the power generation device, the solar panel may be disposed between the dial 2 and a first conductive element 51 of the inverted-F antenna 50, which will be described below, and the dial 2 may be configured by a light transmissive member.

Plate-Shaped Inverted-F Antenna

Figure 3:
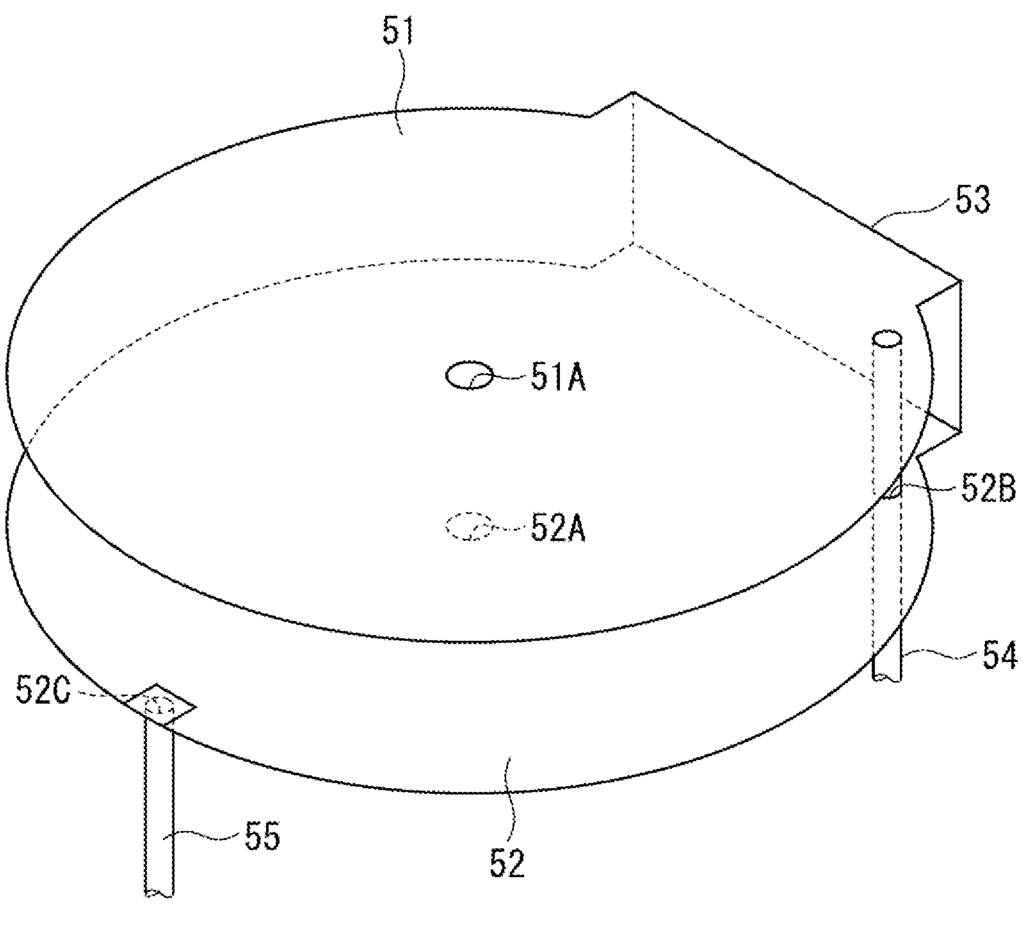
FIG. 3 is a perspective view illustrating a plate-shaped inverted-F antenna used in the electronic watch with the built-in antenna.
Figure 4:
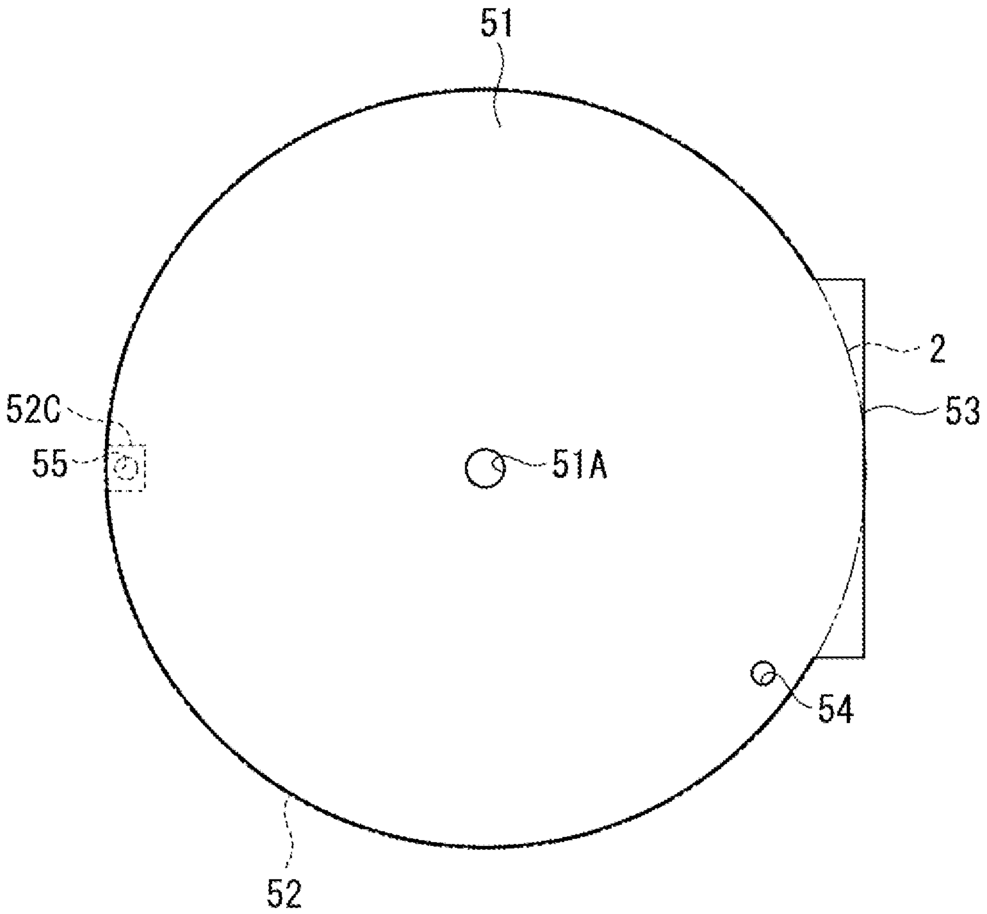
FIG. 4 is a plan view illustrating the inverted-F antenna.

As illustrated in FIG. 2 to FIG. 4, the inverted-F antenna 50 is configured to include the plate-shaped first conductive element 51, a plate-shaped second conductive element 52 arranged so as to overlap with the first conductive element 51 in plan view, and a short circuit portion 53 that short circuits the first conductive element 51 and the second conductive element 52. The inverted-F antenna 50 is disposed between the main plate 21 and the dial 2. Thus, the inverted-F antenna 50 is a planar antenna disposed between the dial 2 and the main plate 21.

The first conductive element 51 is electrically coupled to the receiver IC mounted on the printed wiring board 23 via a power supply element 54. The second conductive element 52 is electrically coupled to a ground terminal of the printed wiring board 23 via a coupling element 55.

As illustrated in FIG. 3 and FIG. 4, the first conductive element 51 and the second conductive element 52 are formed in a disc shape having substantially the same diameter as the dial 2 excluding the short circuit portion 53, and through holes 51A and 52A through which the pointer shafts 35 to 37 are inserted are formed in the planar center position. A through hole 52B through which a power supply element 54 is inserted and a grounding terminal 52C to which the coupling element 55 is coupled are formed in the second conductive element 52. Note that, as the inverted-F antenna 50, the second conductive element 52 serving as a ground electrode is preferably configured to be one size larger than the first conductive element 51 serving as a radiation electrode, and a position of the outer circumference of the first conductive element 51 is preferably disposed inside the outer circumference of the second conductive element 52.

The first conductive element 51 and the second conductive element 52 are preferably formed of sheet metal such as copper, copper alloy, aluminum, aluminum alloy, or the like. By causing the first conductive element 51 and the second conductive element 52 to be formed of metal in this manner, they can be made thin and can be easily molded. Further, the first conductive element 51 and the second conductive element 52 can also be configured by a metal coating formed on a front surface of a dielectric substrate 56. The metal coating can be formed by plating using metal such as copper, silver, nickel, aluminum, and the like, for example.

Note that one of the first conductive element 51 and the second conductive element 52 may be formed of metal, and the other may be configured by applying the metal coating to the substrate.

The short circuit portion 53 is configured by a similar material as those of the first conductive element 51 and the second conductive element 52, namely, is configured by a conductor. The short circuit portion 53 is provided on outer edge portions of the first conductive element 51 and the second conductive element 52.

The short circuit portion 53 may be formed in a linear shape so as to vertically couple the first conductive element 51 and the second conductive element 52, or may be formed so as to include a curved portion bulging to the outer circumference side. By providing the curved portion in the short circuit portion 53, the curved portion can be caused to function as a buffer portion that absorbs an impact received from the outside.

The short circuit portion 53 may be provided at one location, or may be provided at a plurality of locations. In other words, it is sufficient that the first conductive element 51, the second conductive element 52, and the short circuit portion 53 be designed so as to be able to obtain reception characteristics necessary for receiving the GPS satellite signals.

In the present embodiment, the dielectric substrate 56 formed of a synthetic resin is disposed between the first conductive element 51 and the second conductive element 52.

The dielectric substrate 56 may be provided exclusively for the inverted-F antenna 50, but another watch component may be used as the dielectric substrate 56. For example, in a case of an electronic watch provided with a calendar indicator, such as the date indicator or a day indicator, a calendar holder that holds the calendar indicator may be used as the dielectric substrate 56.

The first conductive element 51, the second conductive element 52, and the short circuit portion 53 are preferably formed as an integral structure using, for example, a method such as bending and molding a sheet metal by pressing. By applying such a configuration, the inverted-F antenna 50 can be manufactured more efficiently.

In the present embodiment, when the inverted-F antenna 50 is incorporated into the watch case 10, the short circuit portion 53 of the inverted-F antenna 50 is disposed outside of the outer circumference of the dial 2 in plan view of the dial 2. Thus, at least a portion of the inverted-F antenna 50 is disposed outside of the outer circumference of the dial 2 in plan view as seen from a direction orthogonal to the front surface of the dial 2. In other words, in the present embodiment, as illustrated in FIG. 2 and FIG. 4, the short circuit portion 53, which is at least a portion of the inverted-F antenna 50, is disposed outside of the outer circumference of the dial 2.

The power supply element 54 is coupled to a power supply terminal provided on the printed wiring board 23, and has a function of supplying signals received by the first conductive element 51 and the second conductive element 52 to the receiver IC mounted on the printed wiring board 23.

The coupling element 55 couples the ground terminal provided on the printed wiring board 23 and the grounding terminal 52C provided on the second conductive element 52.

Note that when a solar panel is provided between the dial 2 and the first conductive element 51, the first conductive element 51 may also be used as a support substrate for the solar panel.

Next, a relationship between the inverted-F antenna 50 and a dielectric that affects a reception performance of the inverted-F antenna 50 in the electronic watch 1 will be described.

The inventors of the present application have discovered a new problem in that when an edge on the cover glass 13 side of the watch case 10, that is, the bezel 12, is formed from a conductive material, such as stainless steel or titanium, in addition to a deterioration in the reception performance due to the effect of the metal bezel 12, a further deterioration in the reception performance occurs due to a deviation between resonant frequency and radiation efficiency.

Figure 5:
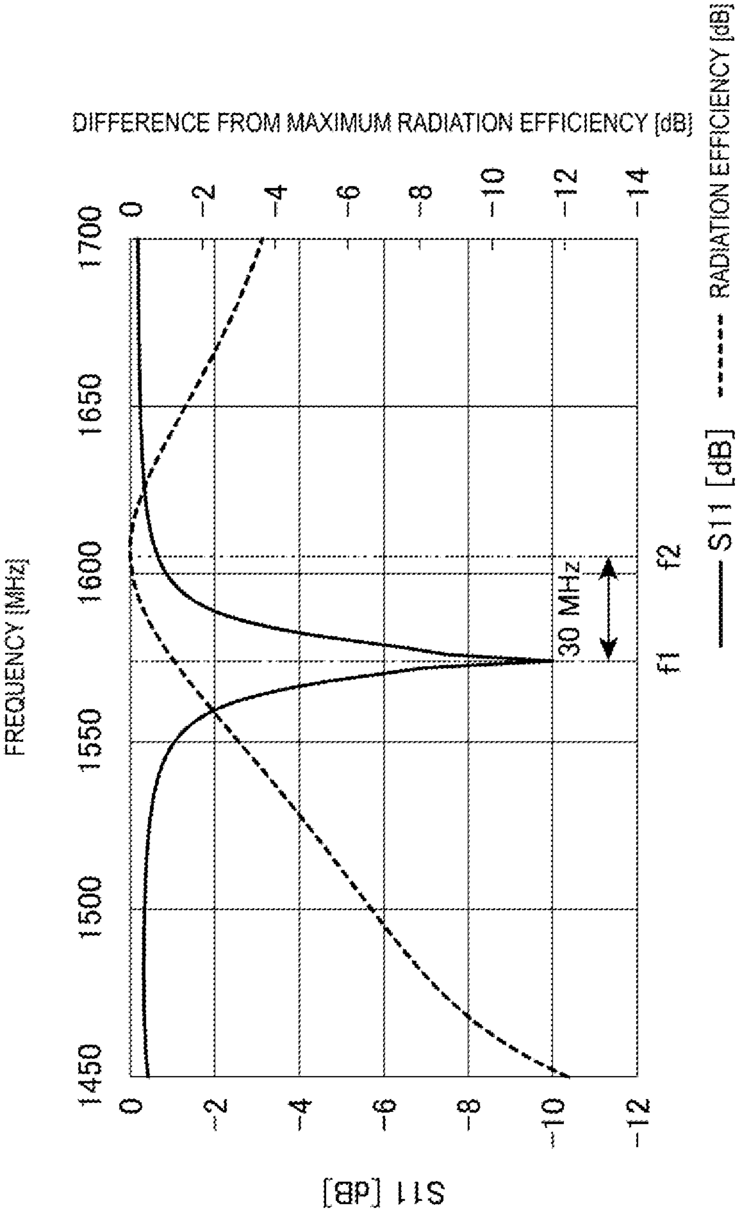
FIG. 5 is a graph showing reception characteristics of the inverted-F antenna.

In other words, with the inverted-F antenna 50 for receiving satellite signals built into the electronic watch 1 that is the wrist watch, a larger planar area of the first conductive element 51 and the second conductive element 52 is necessary, compared to the patch antenna, and the outer circumferential edge of the inverted-F antenna 50 is disposed in close proximity to the bezel 12. Thus, in order to improve the design and quality of the watch case 10, when the bezel 12 is formed from a metal material such as stainless steel or titanium, as illustrated in a graph shown in FIG. 5, there is a deviation of approximately 30 MHz between a resonant frequency f1 of the inverted-F antenna 50 and a frequency f2 at which the radiation efficiency is at a maximum. It has been found that this deviation has an effect on the deterioration in the reception performance. In the graph shown in FIG. 5, the horizontal axis is a frequency (MHz), the first vertical axis provided on the left side of the graph is a reflection characteristic S11 (dB) of the inverted-F antenna 50, and the second vertical axis provided on the right side of the graph is a difference (dB) when the maximum radiation efficiency is 0 dB. In the present embodiment, the resonant frequency f1 is set for the inverted-F antenna 50 so that the inverted-F antenna 50 resonates with the frequency of radio waves transmitted from the GPS satellite. In the configuration of the present embodiment, a frequency f2 at which the radiation efficiency of the inverted-F antenna 50 is at the maximum deviates from the resonant frequency f1 by approximately 30 MHz. Due to the occurrence of this deviation, an antenna gain of the inverted-F antenna 50 is reduced at the resonant frequency f1.

Therefore, in order to improve the reception performance of the inverted-F antenna 50, the deviation between the resonant frequency f1 and the frequency f2 should be reduced. Thus, in the present embodiment, by using a watch component used in the electronic watch 1 as a dielectric of the inverted-F antenna 50, the frequency of a received signal is reduced.

The dielectric that contributes to reducing the frequency of the satellite signal received by the inverted-F antenna 50 is a dielectric disposed within a predetermined distance set in accordance with the wavelength of received radio waves, with respect to the inverted-F antenna 50. Note that the predetermined distance between the dielectric disposed above, that is, on the cover glass 13 side of the inverted-F antenna 50 and the inverted-F antenna 50 is a distance between an upper surface of the inverted-F antenna 50, that is, an upper surface of the first conductive element 51 and a lower surface of the dielectric. For example, the predetermined distance between the cover glass 13, which serves as the dielectric, and the inverted-F antenna 50 is a dimension H illustrated in FIG. 2.

In the electronic watch 1, the dielectrics that contribute to reducing the frequency of the satellite signals are the dial 2, the cover glass 13, and the dial ring 15, which are disposed above the inverted-F antenna 50. Here, in order to confirm the effect of the distance between the cover glass 13 and the inverted-F antenna 50 on the reception characteristics, changes in the antenna gain depending on an arrangement position of the cover glass 13 were measured in the electronic watch 1 provided with the dial 2 and the dial ring 15.

When the antenna gain of the inverted-F antenna 50 when the cover glass 13 was not provided was 0 dB, when the distance between the lower surface of the cover glass 13 and the upper surface of the inverted-F antenna 50 was 3.5 mm, the antenna gain improved by approximately 1.0 dB, when the distance is 4.5 mm the antenna gain was equivalent to when the cover glass 13 was absent, and when the distance was 4.9 mm, the antenna gain worsened by approximately 0.5 dB. Thus, by setting the distance between the lower surface of the cover glass 13 and the upper surface of the inverted-F antenna 50 to be 4.5 mm or less, the antenna gain can be improved by the cover glass 13.

Here, the frequency of a radio wave L1 transmitted from the GPS satellite is 1575.42 MHz, and a wavelength λ is approximately 190 mm. Since 190 mm÷4.5 mm=approximately 42, the predetermined distance H may be set to 1/42 or less of the wavelength λ.

Of the dial 2, the cover glass 13, and the dial ring 15, which serve as the dielectrics, the dial 2 having a large area near the inverted-F antenna 50 has the largest effect on the inverted-F antenna 50. Since the cover glass 13 is disposed further away from the inverted-F antenna 50 compared to the dial 2, unless the cover glass 13 is a dielectric that has a higher relative dielectric constant than the dial 2, the effect of the cover glass 13 on reducing the resonant frequency is smaller. On the other hand, when the relative dielectric constant of the cover glass 13 is larger, by a certain amount or more, than that of the dial 2, the effect of the cover glass 13 on reducing the resonant frequency becomes excessive, and, in contrast/in fact, the deviation between the resonant frequency f1 and the frequency f2 increases.

Thus, the material of the cover glass 13 is preferably a material having a relative dielectric constant within a predetermined range with respect to the relative dielectric constant of the dial 2. As a result of the actual measurement of the electronic watch 1 according to the present embodiment, with respect to the dial 2 formed from the polycarbonate resin having a relative dielectric constant of approximately 3, when the relative dielectric constant of the cover glass 13 was less than approximately 6, the frequency hardly changed, and when the relative dielectric constant was greater than approximately 15, the frequency changed too much, and in contrast, the antenna gain decreased.

Therefore, the relative dielectric constant of the cover glass 13 is preferably from approximately 6 to 15, that is, from 2 times to 5 times greater than the relative dielectric constant of the dial 2. Thus, in the present embodiment, the cover glass 13 formed from sapphire glass having a relative dielectric constant of approximately 10 is used, and the antenna gain is improved by approximately 1.0 dB compared to a case in which the cover glass 13 having a relative dielectric constant of approximately 3 is used.

Advantageous Effects of First Embodiment

Since in the electronic watch 1, the dial ring 15 is formed from the polycarbonate resin and the cover glass 13 is formed from the sapphire glass, the dial 2, the dial ring 15, and the cover glass 13 each configured by the non-conductive material can be caused to function as the dielectric.

Then, since the dial 2, the dial ring 15, and the cover glass 13 are disposed within the predetermined distance set in accordance with the wavelength of the radio waves received by the inverted-F antenna 50, specifically, within 1/42 or less of the wavelength λ, due to the wavelength shortening effect of the dial 2, the dial ring 15, and the cover glass 13, which serve as the dielectrics, the deviation between the resonant frequency f1 of the inverted-F antenna 50, and the frequency f2 at which the radiation efficiency is optimal can be suppressed. As a result, even when the bezel 12 is configured by the conductive material such as stainless steel or titanium, the reduction in the antenna gain, namely, the deterioration in the reception performance can be suppressed.

Therefore, by using the metal bezel 12, the design of the watch case 10 can be improved, and at the same time, by using the inverted-F antenna 50 that can be made thinner compared to the patch antenna, the electronic watch 1 can be made thinner, and the reception performance of the inverted-F antenna 50 can be secured.

Further, since the inverted-F antenna 50 that can be made thinner is used, watch components such as the battery 24, the motors, and the train wheel can be disposed so as to overlap with the inverted-F antenna 50 in plan view. Thus, the electronic watch 1 can be downsized, that is, the planar size of the electronic watch 1 can be reduced.

The dial 2 is formed from the polycarbonate resin having the relative dielectric constant of approximately 3, and the cover glass 13 is formed from the sapphire glass having the relative dielectric constant of approximately 10, that is, the relative dielectric constant that is from 2 times to 5 times greater than the relative dielectric constant of the dial 2, and thus, the resonant frequency can be caused to change by an appropriate amount. Thus, the deviation between the resonant frequency of the inverted-F antenna 50 and the frequency at which the radiation efficiency is optimal can be reduced, and the deterioration in the reception performance can be further suppressed.

By disposing the cover glass 13 within the predetermined distance from the inverted-F antenna 50, the cover glass 13 can be caused to function as the dielectric that shortens the wavelength of the radio waves received by the inverted-F antenna 50. Thus, the deterioration in the reception performance can be suppressed without separately providing an additional dielectric component that achieves the wavelength shortening effect.

Similarly to the dial 2, the cover glass 13 has a large area in plan view of the electronic watch 1, so by disposing the cover glass 13 within the predetermined distance with respect to the inverted-F antenna 50 and by using the cover glass 13 as the dielectric, even when a sufficient wavelength shortening effect cannot be achieved with the dial 2 alone, as a result of the wavelength shortening effect by the cover glass 13 being added, the resonant frequency can be caused to change appropriately, and the deterioration in the reception performance can be suppressed.

By disposing the dial ring 15 within the predetermined distance from the inverted-F antenna 50, the dial ring 15 can be caused to function as the dielectric that shortens the wavelength of the radio waves received by the inverted-F antenna 50. Thus, the deterioration in the reception performance can be suppressed without separately providing an additional dielectric component that achieves the wavelength shortening effect.

Since the inverted-F antenna 50 that resonates at λ/4 is used as the antenna for receiving the satellite signals, the antenna can be made smaller compared to an antenna that resonates at λ/2. Thus, the external size of the electronic watch 1 including the inverted-F antenna 50 can also be configured to be smaller.

Second Embodiment

Next, an electronic watch with a built-in antenna according to a second embodiment will be described. The electronic watch according to the second embodiment is an electronic watch in which the plate-shaped inverted-F antenna 50 of the first embodiment is changed to a wire-shaped inverted-F antenna 150, and otherwise, the configuration is the same as that of the first embodiment. Thus, the configuration other than the inverted-F antenna 150 is omitted from the drawings, and the same reference signs as in the first embodiment will be used in the following description.

Figure 6:
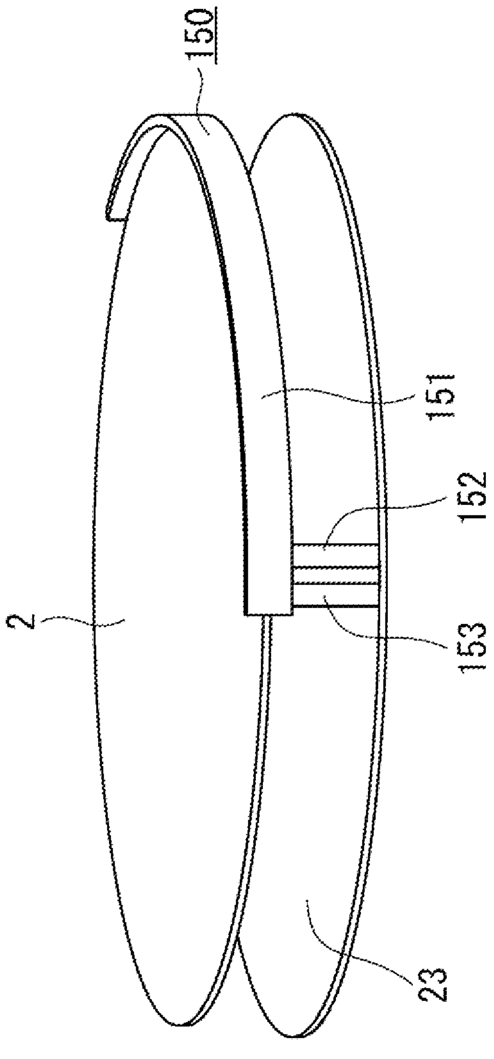
FIG. 6 is a perspective view illustrating an inverted-F antenna of a second embodiment.

FIG. 6 is a schematic diagram for describing a configuration of the inverted-F antenna 150. As illustrated in FIG. 6, the inverted-F antenna 150 is provided with a ribbon 151, a power supply portion 152, and a short circuit portion 153.

The ribbon 151 is formed in an arc shape, and the power supply portion 152 and the short circuit portion 153 are formed in a linear shape.

The ribbon 151, the power supply portion 152, and the short circuit portion 153 may be configured using a wire or a pipe made from copper wire, aluminum or the like, or may be configured using a thin plate made from copper wire, aluminum or the like. By configuring the ribbon 151, the power supply portion 152, and the short circuit portion 153 using the wire, pipe or thin plate, the ribbon 151, the power supply portion 152, and the short circuit portion 153 can be manufactured inexpensively.

Further, the ribbon 151, the power supply portion 152, and the short circuit portion 153 may be formed by attaching a conductive foil to a base having an appropriate shape, etching, printing, or the like. When the ribbon 151, the power supply portion 152, and the short circuit portion 153 are formed by attaching the conductive foil to the base, variations in the shape of the inverted-F antenna 150 are reduced, characteristics of the antenna become stable, and variations in the reception performance can also be prevented.

Further, the ribbon 151, the power supply portion 152, and the short circuit portion 153 may be formed by plating the dial ring 15 formed from a synthetic resin.

Further, when a casing frame configured by a polycarbonate resin or the like is provided in the watch case 10, the ribbon 151, the power supply portion 152, and the short circuit portion 153 may be formed by plating an inner circumference surface of the casing frame.

When the dial ring 15 and the casing frame of the watch case 10 are plated to configure the inverted-F antenna 150, a watch component can also be used as an antenna component, and thus inexpensive manufacturing is possible.

The power supply unit 152 and the short circuit portion 153 are coupled to one end of the ribbon 151 of the inverted-F antenna 150, and the other end of the ribbon 151 is open. The power supply portion 152 and the short circuit portion 153 are coupled to the printed wiring board 23, the power supply unit 152 is coupled to a signal pattern of the printed wiring board 23, and the short circuit 153 is coupled to a GND pattern of the printed wiring board 23.

In an inner space of the watch case 10, at least a portion of the inverted-F antenna 150 is disposed outside the outer circumference of the dial 2 in plan view as seen from the direction orthogonal to the front surface of the dial 2. For example, when the casing frame of the watch case 10 is formed from a synthetic resin, a groove may be formed in an inner wall of the casing frame, and the ribbon 151 may be accommodated and held by this groove. In this case, the ribbon 151 is disposed outside the outer circumference of the dial 2 in plan view.

Note that, a method for holding the ribbon 151 is not limited to the method of using the groove, but a method may also be used in which convex portions that guide the ribbon 151 are provided at a plurality of locations inside the casing frame, and the ribbon 151 is held by these convex portions, for example.

The ribbon 151 and the short circuit portion 153 of the inverted-F antenna 150 according to the present embodiment are configured in the same manner as when a dipole antenna having a length sufficiently shorter than 1λ is bent to form the ribbon 151 as an arc-shaped loop element (a magnetic current element) and the short circuit portion 153 as a straight element (a current element).

The ribbon 151 is disposed at a position substantially overlapping with the bezel 12 in plan view, and is disposed below the bezel 12 in the vertical direction, with a predetermined gap being provided between the ribbon 151 and the bezel 12. The power supply unit 152 for moving a power supply point is coupled to the ribbon 151. The short circuit portion 153 is coupled to the GND pattern of the printed wiring board 23, and the power supply portion 152 is coupled to the signal pattern of the printed wiring board 23. In such a configuration, the short circuit portion 153 and bezel 12 each operate as a current element that generates a current vector, and the ribbon 151 operates as a magnetic current element that generates a magnetic current vector. In other words, the printed wiring board 23 functions as a GND plate, and the printed wiring board 23 is disposed below the ribbon 151 in the vertical direction.

Thus, the bezel 12 is a parasitic element, and the ribbon 151 is an element coupled to the power supply portion 152.

Since the inverted-F antenna 150 is wire-shaped, the inverted-F antenna 150 does not include the dielectric substrate 56, in contrast to the plate-shaped inverted-F antenna 50. On the other hand, in the electronic watch according to the second embodiment also, the dial 2, the dial ring 15, and the cover glass 13 function as dielectrics for the inverted-F antenna 150.

Advantageous Effects of Second Embodiment

In the electronic watch according to the second embodiment, in addition to the dial 2, the dial ring 15 and the cover glass 13 can also be used as the dielectrics for the inverted-F antenna 150, and the same effects as in the first embodiment can thus be achieved.

Further, since with the wire-type inverted-F antenna 150, the ribbon 151 can be disposed on the outer circumference side of the dial 2, the electronic watch can be made even thinner and smaller than the electronic watch 1 using the plate-shaped inverted-F antenna 50.

Third Embodiment

Figure 7:
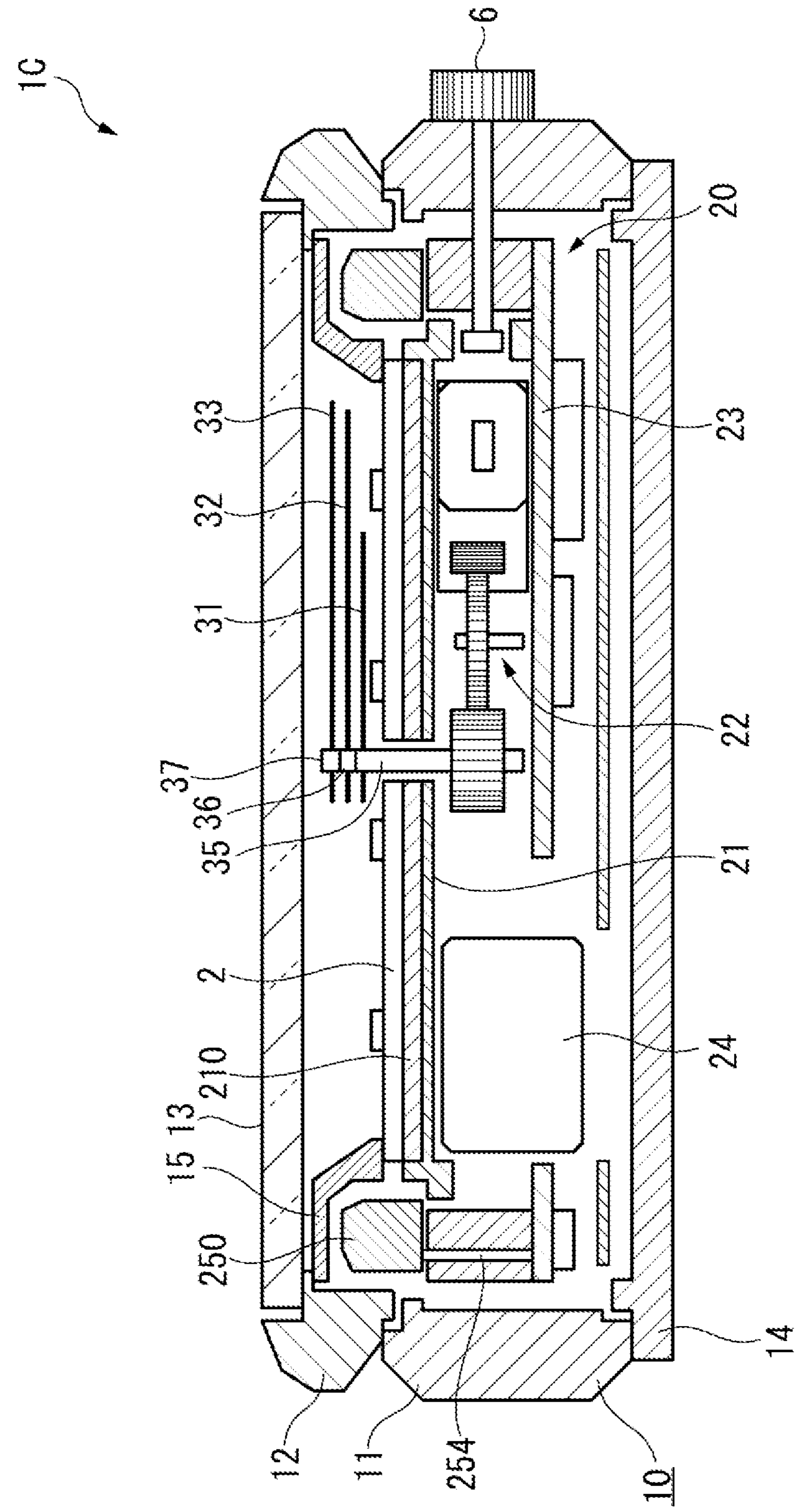
FIG. 7 is a cross-sectional view illustrating main portions of an electronic watch with a built-in antenna according to a third embodiment.

Next, an electronic watch 1C according to a third embodiment will be described. The electronic watch 1C of the third embodiment differs from the electronic watch 1 of the first embodiment in that an annular antenna (a ring antenna) 250 is used, as illustrated in FIG. 7. Thus, with respect to the electronic watch 1C, the configuration that is identical or similar to that of the electronic watch 1 will be denoted by the same reference signs, and a description thereof will be omitted.

The electronic watch 1C is provided with the transmissive dial 2 and a solar panel 210 disposed on the back surface side of the dial 2, and power generated by the solar panel 210 is supplied to the battery 24, which is a rechargeable secondary battery.

The annular antenna 250 is not illustrated in detail in the drawings, but includes an annular substrate formed from a dielectric, and an antenna pattern (an antenna element) formed on the substrate. The dielectric is configured by a material having a relative dielectric constant of approximately 5 to 20, for example. In plan view as seen from the cover glass 13 side, the antenna pattern is a C-shaped loop element with a portion of the loop cut out, and functions as an antenna element that converts electromagnetic waves into a current. This antenna pattern is electrically coupled to the printed wiring board 23 via a power supply pin 254.

The annular antenna 250 is disposed along the outer circumference of the dial 2 and the solar panel 210. In other words, the dial 2 and the solar panel 210 are disposed in the inner space of the annular antenna 250.

The annular antenna 250 is covered by the dial ring 15 disposed on the inner circumferential side of the bezel 12.

Similarly to the electronic watch 1, in the electronic watch 1C, the cover glass 13 and the dial ring 15 are each configured by a non-conductive material. The cover glass 13 and dial ring 15 are disposed on the watch front surface side of the annular antenna 250, and are disposed within a predetermined distance, with respect to the antenna pattern of the annular antenna 250, that is set in accordance with the wavelength of the satellite signal received by the annular antenna 250.

Thus, the cover glass 13 and the dial ring 15 are dielectrics that are disposed closer to the watch front surface side than the dial 2.

Advantageous Effects of Third Embodiment

In the electronic watch 1C according to the third embodiment also, the dial ring 15 and the cover glass 13 can be used as dielectrics of the annular antenna 250, and the same effects as in the first embodiment can thus be achieved.

In other words, when the present inventors conducted a study, even when the annular antenna 250 is used, there was a deviation between a resonant frequency of the annular antenna 250 and the frequency at which the radiation efficiency is optimal. However, the amount of deviation was smaller compared to the inverted-F antenna 50, and while the deviation was approximately 30 MHz with the inverted-F antenna 50, the deviation was approximately 10 MHz with the annular antenna 250.

The dial ring 15 and the cover glass 13 exhibit the wavelength shortening effect with respect to the radio waves received by the annular antenna 250, and can suppress the deviation between the resonant frequency of the annular antenna 250 and the frequency at which the radiation efficiency is optimal. Further, even when the bezel 12 is configured by the conductive material such as stainless steel or titanium, the reduction in the antenna gain, namely, the deterioration in the reception performance can be suppressed.

Other Exemplary Embodiments

The present disclosure is not limited to the embodiments described above, and various modifications are possible within the scope of the present disclosure.

In the embodiments described above, the case body 11 and the bezel 12 are separate bodies, but the case body and the bezel may be integrally formed. In this case, the watch case can be manufactured inexpensively. Further, the electronic watch with the built-in antenna need not necessarily include the dial ring.

Figure 8:
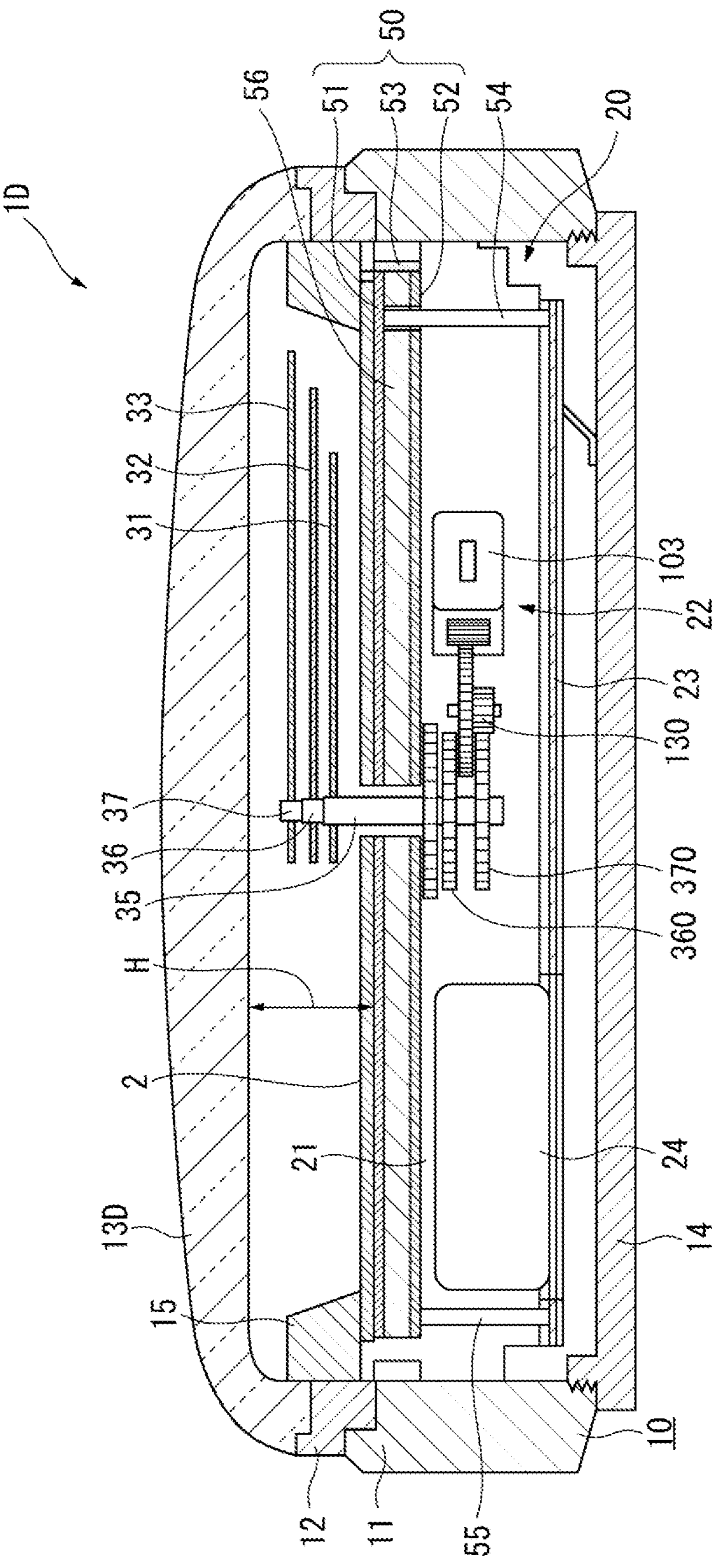
FIG. 8 is a cross-sectional view illustrating main portions of an electronic watch with a built-in antenna according to a modified example.

As illustrated in FIG. 8, an electronic watch 1D may be used in which a cover glass 13D is configured by sapphire box glass. The electronic watch 1D can also achieve the same effects as in the embodiments described above.

Although the dial ring 15 is configured by the dielectric having the relative dielectric constant of approximately 3, the dial ring 15 may be configured by a resin material having a high dielectric constant, for example, a resin material having a relative dielectric constant of approximately 9 to 15. When the dial ring 15 is configured by the high dielectric constant material, the cover glass 13 can be configured by a dielectric having a lower dielectric constant than the sapphire glass. The high dielectric constant material can be, for example, a dielectric constant control resin material "Flectis (registered trademark)" made by Polyplastics Co., Ltd, and the like.

In the electronic watch with the built-in antenna, the dielectric that is disposed closer to the watch front surface side than the antenna, and disposed within the predetermined distance from the antenna may be at least one of the dial, the dial ring, and the cover glass.

The configuration of the inverted-F antenna 50 is not limited to the embodiments described above. For example, the second conductive element 52 need not necessarily be disposed on the upper surface of the case back 21, but may be disposed on the upper surface of the printed wiring board 23, and the first conductive element 51 and the second conductive element 52 may be disposed so as to be separated from each other. In this case, the second conductive element 52 can be directly electrically coupled to the ground terminal of the printed wiring board 23, and the coupling element 55 can be eliminated.

Further, the inverted-F antenna 50 may be set to a size corresponding to the type of radio waves to be received, and as long as the inverted-F antenna 50 can receive the radio waves, the portion thereof disposed on the outer circumference of the dial 2 in plan view may not be necessary.

In each of the embodiments described above, the satellite signals transmitted from the GPS satellite are received, but signals received by the antenna are not limited thereto. For example, satellite signals including time information may be received from other global navigation satellite systems (GNSS), such as Galileo (EU), GLONASS (Russia), and BeiDou (China), geostationary satellites such as SBAS, quasi-zenith satellites, and the like.

In addition, besides such satellite signals, the antenna in each of the embodiments described above may receive other radio waves such as, Bluetooth (registered trademark), Bluetooth Low Energy (BLE), Wi-Fi (registered trademark), Near Field Communication (NFC), Low Power Wide Area (LPWA), and the like.

What is claimed is:

1. An electronic watch with a built-in antenna, the electronic watch comprising:

a watch case including a case body configured of a conductive material, a bezel configured of a conductive material and provided on a watch front surface side of the case body, and a cover glass attached to the bezel;

a dial disposed inside the watch case;

a dial ring disposed around the dial; and an antenna disposed inside the watch case, with at least a portion of the antenna being disposed outside an outer circumference of the dial in plan view as seen from a direction orthogonal to a front surface of the dial, wherein the cover glass is a dielectric disposed to be closer to the watch front surface side than to the antenna and disposed within a predetermined distance from the antenna, the distance being set in accordance with a wavelength of radio waves received by the antenna;

the antenna includes a first conductive element and a second conductive element that are spaced apart from each other in an axial direction defined by an axially extending shaft of the electronic watch, the first conductive element and the second conductive element being connected by a short circuit portion that extends in the axial direction; and the first and second conductive elements are each disc-shaped planar members that extend in parallel with the dial, and the first and second conductive elements each include a centrally located aperture configured for receipt of the axially extending shaft.

2. The electronic watch with a built-in antenna according to claim 1, wherein the dielectric is configured of a material having a relative dielectric constant from 2 times to 5 times greater than a relative dielectric constant of a non-conductive material configuring the dial.

3. The electronic watch with a built-in antenna according to claim 1, wherein the antenna is a planar antenna disposed between the dial and a main plate disposed inside the watch case, and including a substrate configured of a non-conductive material and an electrode formed at the substrate.

4. The electronic watch with a built-in antenna according to claim 1, wherein the antenna is an annular antenna disposed between the dial and the watch case.

5. The electronic watch with a built-in antenna according to claim 1, wherein a distance between the antenna and the dielectric is 1/42 or less of the wavelength of the radio waves.

6. The electronic watch with a built-in antenna according to claim 1, wherein the first conductive element, the second conductive element, and the short circuit portion are unitary with each other.

* * * * *